US009794272B2

(12) United States Patent
Strub et al.

(10) Patent No.: US 9,794,272 B2
(45) Date of Patent: Oct. 17, 2017

(54) METHOD AND APPARATUS FOR MONITORING MALICIOUS TRAFFIC IN COMMUNICATION NETWORKS

(75) Inventors: Lyle Strub, Ottawa (CA); Adrian Grah, Kanata (CA); Bashar Said Bou-Diab, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 3793 days.

(21) Appl. No.: 11/324,648

(22) Filed: Jan. 3, 2006

(65) Prior Publication Data

US 2007/0153689 A1   Jul. 5, 2007

(51) Int. Cl.
*H04L 12/26* (2006.01)
*H04L 29/06* (2006.01)

(52) U.S. Cl.
CPC ...... *H04L 63/1408* (2013.01); *H04L 63/1441* (2013.01)

(58) Field of Classification Search
CPC .................... H04L 63/1441; H04L 63/1408
USPC ..................................... 726/22–24
See application file for complete search history.

(56) References Cited

U.S. PATENT DOCUMENTS

| 6,681,331 | B1* | 1/2004 | Munson et al. ............... 726/23 |
| 2002/0095492 | A1 | 7/2002 | Kaashoek et al. |
| 2002/0107953 | A1 | 8/2002 | Ontiveros et al. |
| 2003/0074582 | A1* | 4/2003 | Patel et al. .................... 713/201 |
| 2004/0030776 | A1* | 2/2004 | Cantrell et al. ............... 709/224 |
| 2004/0098623 | A1* | 5/2004 | Scheidell ....................... 713/201 |
| 2004/0143756 | A1* | 7/2004 | Munson et al. ............... 713/200 |
| 2005/0229254 | A1* | 10/2005 | Singh et al. .................... 726/23 |
| 2006/0010493 | A1* | 1/2006 | Piesco et al. ................... 726/23 |
| 2006/0095968 | A1* | 5/2006 | Portolani et al. .............. 726/23 |

* cited by examiner

*Primary Examiner* — Saleh Najjar
*Assistant Examiner* — Devin Almeida
(74) *Attorney, Agent, or Firm* — Kramer & Amado, P.C.

(57) ABSTRACT

A method and apparatus for monitoring data traffic in a communication network are provided. A router connected to the communication network monitors information contained in the data traffic, and based on the information determines whether data in the traffic is indicative of a malicious threat to one or more resources connected to the network. Parameters which control monitoring of traffic at the router, such as the sampling rate and what information is to be extracted from the data is varied according to the condition of the network so that the monitoring can be adapted to focus on traffic which relates to a particular suspected or detected threat.

22 Claims, 6 Drawing Sheets

Threshold Definition Table

| Threat | Threshold Level 1 | Threshold Level 2 | Threshold Level 3 |
|---|---|---|---|
| Threat 1 | $TL\ 1_1$ | $TL\ 2_1$ | $TL\ 3_1$ |
| Threat 2 | $TL\ 1_2$ | $TL\ 2_2$ | $TL\ 3_2$ |
| Threat 3 | $TL\ 1_3$ | $TL\ 2_3$ | $TL\ 3_3$ |
| Threat 4 | $TL\ 1_4$ | $TL\ 2_4$ | $TL\ 3_4$ |
| Threat 5 | $TL\ 1_5$ | $TL\ 2_5$ | $TL\ 3_5$ |
| ⋮ | ⋮ | ⋮ | ⋮ |
| Threat N | $TL\ 1_N$ | $TL\ 2_N$ | $TL\ 3_N$ |

FIG. 4

Monitoring Criteria Table

| Threshold Level 1 | Monitor Criteria | Threshold Level 2 | Monitor Criteria |
|---|---|---|---|
| $TL_1$ (Threat 1) | MC1 T1 | $TL_2$ (Threat 1) | MC2 T1 |
| $TL_1$ (Threat 2) | MC1 T2 | $TL_2$ (Threat 2) | MC2 T2 |
| $TL_1$ (Threat 3) | MC1 T3 | $TL_2$ (Threat 3) | MC2 T3 |
| $TL_1$ (Threat 4) | MC1 T4 | $TL_2$ (Threat 4) | MC2 T4 |
| $TL_1$ (Threat 5) | MC1 T5 | $TL_2$ (Threat 5) | MC2 T5 |
| ⋮ | ⋮ | ⋮ | ⋮ |
| $TL_1$ (Threat N) | MC1 TN | $TL_2$ (Threat N) | MC2 TN |

FIG. 5

METHOD AND APPARATUS FOR MONITORING MALICIOUS TRAFFIC IN COMMUNICATION NETWORKS

FIELD OF THE INVENTION

The present invention relates to methods and apparatus for monitoring traffic in communication networks for the detection of malicious traffic, and in particular, but not limited to detecting malicious traffic in routed IP networks.

BACKGROUND OF THE INVENTION

One of the problems facing architects and providers of communication networks and related services is the provision of network security which has the ability to effectively detect and isolate malicious traffic in the network before its effect is felt by the intended recipients. Malicious traffic can take the form of attacks against a service provider's network equipment, or attacks directed at external nodes, but which pass through a service provider's network. Service providers need to detect and eliminate this traffic in order to protect both their routers and the nodes connected to their network, which often belong to their customers. The difficulty in detecting these attacks arises from the fact that there are many different varieties of malicious traffic, and there are limited resources available at the router for traffic monitoring. A further difficulty is that the type of attacks are continually changing, and in general cannot be isolated by simple filters.

Currently, there are two primary means to provide network security focused monitoring required for general attack detection: (1) the use of special purpose in-line appliances, an example of which is shown in FIG. 1, and (2) the use of existing router monitoring abilities to generate statistics that are interpreted by off-node tools, as for example shown in FIG. 2.

Referring to FIG. 1, a communication network 1 comprises a core routed network 3 and edge routers 5 of other communication networks, each of which is connected to the core routed network 3 through an in-line security appliance 7. The in-line security appliances monitor traffic flowing between the edge routers 5 and core network 3 for the presence of malicious traffic. If malicious traffic is detected, the in-line security appliances attempt to isolate the traffic to prevent it migrating from one network to another.

Special purpose network appliances for attack detection are common in enterprise Local Area Networks (LANs). Examples of in-line intrusion detection systems include products from Checkpoint Software Technologies and Juniper Networks NetScreen Appliance Line. These devices, however, are very rarely deployed in large scale networks, i.e. service provider Wide Area Networks (WANs). The number and speed of interfaces in wide area networks lead to a relatively high cost per bit, and provide a challenge that in-line appliances cannot solve in an economical manner.

In the example of FIG. 2, the data flow through a router 9 is sampled and the data collected in a flow table 11. Designated packet information is selected from the flow table and exported to an external server 13, called a "collector", for interpretation. The interpreted results are typically transferred to one or more application servers 15 for further use, such as monitoring by an operator. A collector and accompanying operational support system (OSS) software suite that analyzes, for malicious traffic, data collected at a network node is offered by Arbor Networks. Other off-line software tools exist that also analyze traffic flow records, examples of which include "Ntop", which provides visualization of user selected aggregate groups, and "AutoFocus", which automatically extracts "significant events" from the observed statistics.

In systems which use exported flow data sampled at network nodes, the stream of input data from the sampler of the node to the flow table is determined by the configuration of the flow statistics collection system at the router, which is provisioned manually by a network operator. The packet information (i.e. header fields) that is used to create the flow statistics for export is also determined when the data collection system is provisioned. The granularity of the collected statistics, both in terms of what flow information is extracted, and at what sampling rate packets are examined, is constant throughout the monitoring process.

A drawback of this approach is that in order to detect a malicious threat, large quantities of data must be collected and exported to the external collector for analysis. This requires both the use of a large amount of internal memory and processing cycles at the router to monitor, collect and export the required amount of data to enable detection of malicious traffic. This technique also consumes network resources, and in particular, available bandwidth in requiring routers to export large amounts of flow data to external servers. Furthermore, this solution usually requires many collectors to be deployed throughout the network in order to process the large volume of flow data produced by the routers.

SUMMARY OF THE INVENTION

According to the present invention, there is provided a method of monitoring data traffic in a communication network, comprising receiving data traffic at a router connected to the communication network, extracting information contained in the received data traffic, and based on the information, determining at the router whether data in the traffic is indicative of a malicious threat to one or more resources connected to the communication network.

In this arrangement, a router is provided with the ability to sample traffic and to determine from the sampled traffic whether data (for example data packets) in the traffic is indicative of a malicious threat. Advantageously, this removes the need to transfer data from the router to an external device such as a collector before a malicious threat can be detected.

In some embodiments, the method comprises performing the monitoring using a first criteria, and, if the determining step determines that data in the traffic is indicative of a malicious threat, performing the monitoring according to a second criteria, different from the first criteria. The first and second criteria may include first and second rates at which received data traffic is sampled to produce the information, where the second sampling rate is higher than the first sampling rate. Thus, in one implementation, the router is configured to sample data traffic at a relatively low sampling rate assuming that steady state conditions apply to the network and that the network is not subjected to a malicious threat. An indication of whether a malicious threat is present may be monitored by comparing information derived from the sampled traffic with a threshold, which if exceeded indicates the presence of a malicious threat. Advantageously, enabling the router to operate at a relatively low sampling rate reduces the demand on the router resources, such as memory space and processing cycles for security monitoring, so that the level of monitoring matches that required for steady state network conditions which prevail most of the time. This also assists in reducing the amount of data that may be exported from the router. (In other embodiments, the sampling rate may be the same for both the first and second criteria, or the sampling rate for the second criteria could be lower than for the first criteria.)

This arrangement constitutes a significant departure from state of the art network security systems which, in order to detect malicious traffic effectively must be configured on the assumption that the network is always being subjected to a malicious attack, and the data sampling rate at the router is therefore set at a constant, maximum value to collect as much data as possible.

In some embodiments, when the router detects an indication of the presence of a malicious threat, for example, when a predetermined threshold is exceeded, the router is configured to transition from its initial monitoring state at which data is sampled at the first rate, to a second monitoring state in which data is sampled at a higher rate. This allows more data to be collected when a malicious attack is suspected on passing the first threshold.

In some embodiments, the method further comprises performing the monitoring according to the second criteria, and determining from information obtained from monitoring according to the second criteria, whether data in the received traffic is indicative of a malicious threat. The determination may be made by comparing information from the received data traffic with a second threshold. The second threshold may be set such that exceeding the threshold is interpreted as detection of a malicious threat.

In some embodiments, the method further comprises monitoring received data according to a third criteria, different from the first and second criteria, if it is determined from information monitored according to the second criteria, that data is indicative of a malicious threat. Thus, for example in this embodiment, if the presence of a malicious threat is detected, for example by a second threshold being surpassed when data is monitored according to the second criteria, the router is configured to transition to a third monitoring state at which data may be monitored at a still higher sampling rate in order to collect more information about the malicious threat, which can subsequently be used to block the malicious traffic.

Thus, in some embodiments, the router is capable of adapting its network security monitoring to network conditions so that an appropriate level of monitoring can be adopted. A relatively low level of monitoring can be used under normal network conditions. When the presence of a malicious threat is suspected, a higher level of monitoring can be used, and if at that monitoring level, a malicious attack is detected, a still higher monitoring level can be used to gather more information about the particular type of attack. In this way, resources of the router need only be used as necessitated by the network conditions.

In some embodiments, the method further comprises identifying a parameter associated with data in the traffic that is indicative of a malicious threat, and controlling selectivity of data in the traffic for the purpose of monitoring based on the parameter. In some embodiments, controlling selectivity may comprise biasing the selectivity of data to be monitored towards data associated with the parameter.

In some embodiments, the parameter may be indicative of a particular portion of a communication network, for example a subnet, and the monitoring may be controlled so that it is more focused on detecting traffic directed to or transmitted from that portion of the network. In some embodiments, this selection process may be implemented by one or more traffic filters.

The parameter may be indicative of a particular type of threat and the monitoring may be controlled so that it is more focused on detecting one particular form of threat than other threats. This may be implemented by applying filtering to the data traffic received at the router. For example, filtering may be applied at the time of sampling the data flow, or may be applied to the collected data after sampling, or a combination of both. In some embodiments, the filtering may be performed by applying one or more aggregation schemes.

In some embodiments, the first monitoring criteria may include monitoring data traffic for a plurality of different malicious threats. Data which is relevant to each threat may be compared to a respective threshold, which if exceeded is indicative of the presence of the threat but may only be sufficient to raise a suspicion that the particular threat is present, rather than definitive of its presence. On detecting such an indication, the router may configure its monitoring based on information from the data flow which is indicative of that particular threat. In this case, monitoring for other types of threat may be reduced or ceased and monitoring for the selected threat increased. Advantageously, this shifting or biasing of the selectivity of data to be monitored towards data associated with the suspected threat allows the monitoring for a particular threat to be enhanced without necessarily using more resources of the router such as memory space and processing cycles.

Also according to the present invention, there is provided a network element for receiving and routing data traffic in a communication network, comprising: an interface for receiving traffic from a communication network, a monitor for monitoring information contained in the received data traffic, and a module for determining from the monitored information, whether data in the traffic is indicative of a malicious threat to one or more resources connected to the communication network.

According to the present invention, there is further provided a network element for receiving and routing data traffic in a communication network, comprising: an interface for receiving data traffic from a communication network, a monitor for monitoring the data traffic, wherein the monitor is operable to monitor the data traffic according to a plurality of different criteria, and is responsive to a detector detecting that data in the traffic is indicative of a malicious threat to one or more resources connected to the communication network to change monitoring from a current monitoring criteria to another monitoring criteria.

Embodiments of the network element may include any suitable routing module or routing means for controlling the routing of received data traffic.

Embodiments of the network element may include any one or more features described above or disclosed herein.

BRIEF DESCRIPTION OF THE DRAWINGS

Examples of embodiments of the present invention will now be described with reference to the drawings, in which:

FIG. 4 shows an example of a threshold definition table for use in embodiments of the present invention;

FIG. 5 shows an example of a monitoring criteria table for use in embodiments of the present invention;

DESCRIPTION OF EMBODIMENTS

Figure 1:
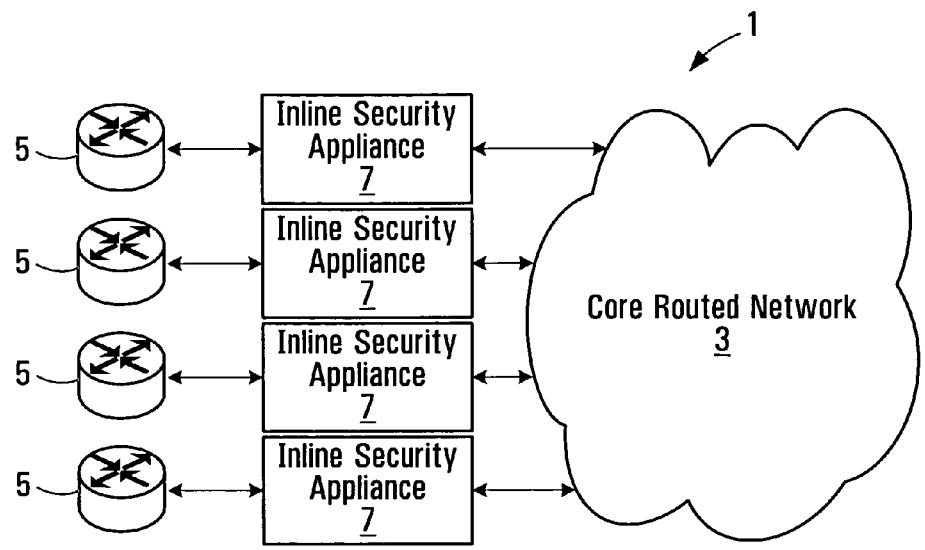
FIG. 1 shows a schematic diagram of a prior art security scheme using in-line security appliances.
Figure 2:
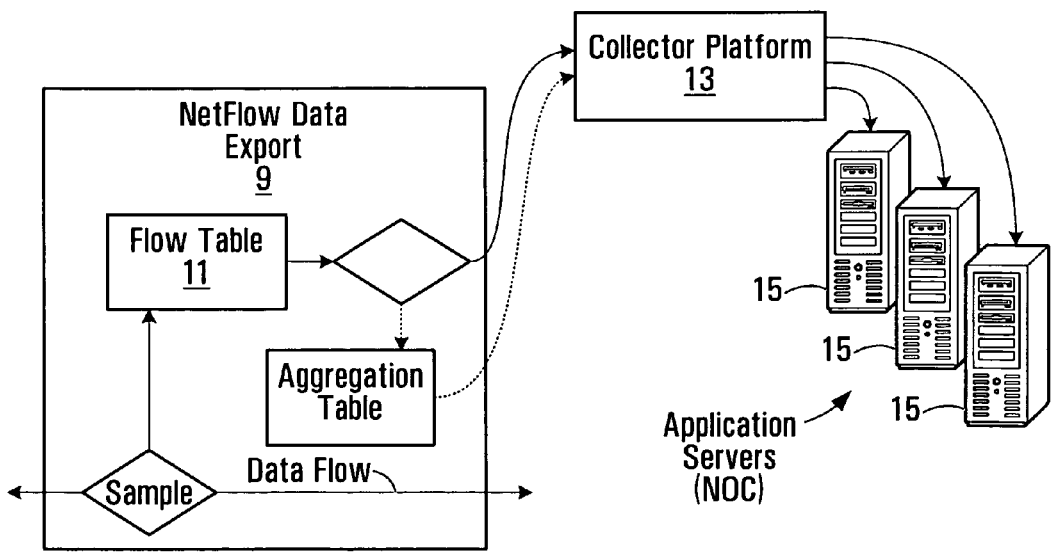
FIG. 2 shows a schematic diagram of another prior art security monitoring scheme in which data sampled at a router is transmitted to an external collector for interpretation and analysis.
Figure 3:
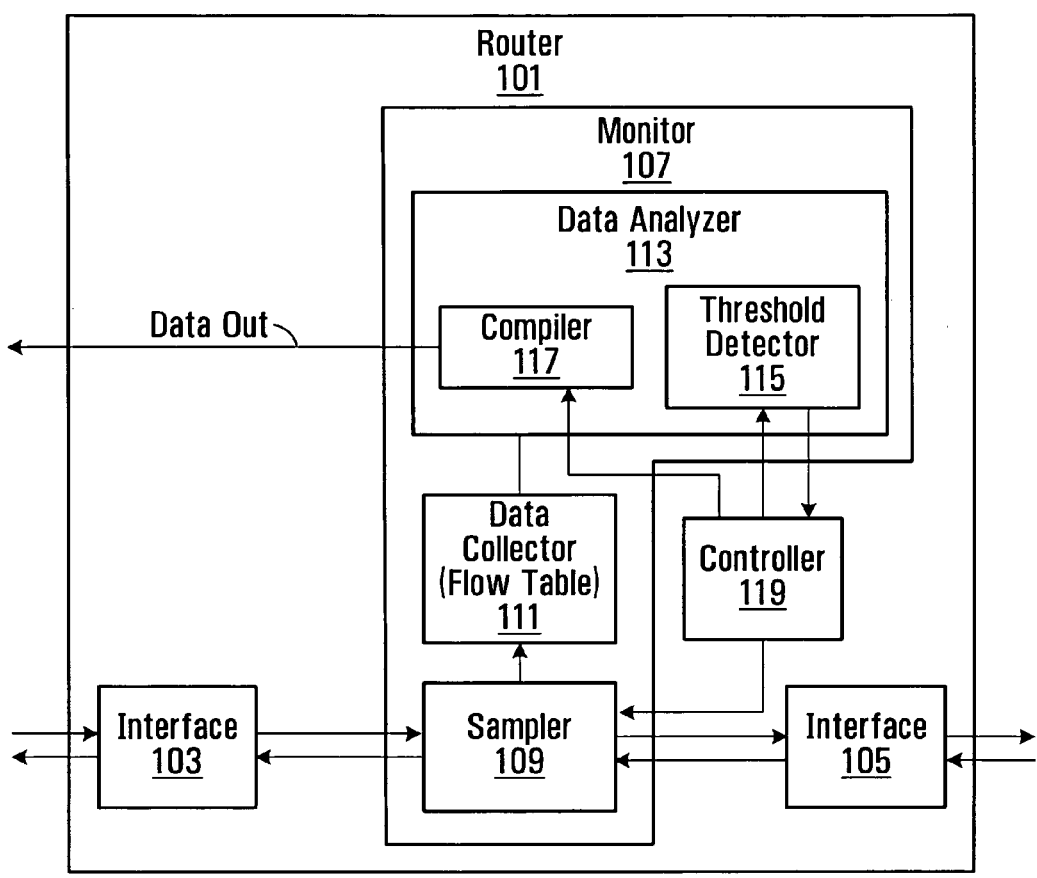
FIG. 3 is a block diagram of a router according to an embodiment of the present invention.

Referring to FIG. 3, a router 101 according to an embodiment of the present invention, comprises first and second interfaces 103, 105 for receiving and transmitting data traffic from and to a communication network, and a monitor 107 for monitoring data traffic received from the network. The monitor 107 comprises a sampler 109 connected to each interface 103, 105 for sampling data received from the network, a data collector 111, for example, a flow table, for collecting data from the sampler 109, and a data analyzer 113 for analyzing data from the data collector. In this embodiment, the data analyzer includes a threshold detector 115 for detecting whether information derived from the data collector exceeds one or more predetermined thresholds, and a compiler 117 for compiling information for export from the router. The router further comprises a controller 119 for controlling operation of the monitor 107. In this embodiment, the controller 119, which may also be referred to as a manager or flow monitoring state manager (FMSM), is adapted to control the sampler 109, the data collector 111, the threshold detector 115 and the compiler 117. In other embodiments, the controller 119 may be adapted to control any one or more of these elements of the monitor or any other function or component thereof.

Meter parameters of the monitor 107 which are controlled by the controller 119 may include any one or more of the following: (1) traffic filters; (2) sampling rate; (3) aggregation scheme; (4) flow table management; and (5) flow data interpretation and export.

Traffic filters are filters that are used to select portions of user traffic on an interface to be monitored. For example, traffic filters may be used to select for monitoring only a specific portion of a communication network, for example a specific IP subnet.

The sampling rate is generally the percentage of received packets that are sampled. The sampling rate may be traffic filter specific, in which case the sampling rate is the percentage of packets within a given traffic filter that are inspected by the meter or monitor for generation of flow statistics.

An aggregation scheme is the selection of packet header (or body) fields used to distinguish individual flows and fields that are to be ignored, i.e. those which are not included in the flow definition, and therefore are implicitly aggregated.

Flow table management refers to the ability to flush data flows that are currently being monitored from the flow table when the associated flow definition changes to create space for recording new data flows resulting from the new definition.

Flow data interpretation and export refers to the control of what happens to the collected flow statistics. For example, they may be exported to an external device, such as a collector, used to generate summary statistics, and/or used to assess whether certain thresholds have been crossed that would indicate potential malicious activity.

In operation, the sampler 109 is configured to detect information from received data packets and transfer this information to the data collector 111. This information may include information contained in the header or body of the data packets such as the source and/or destination address. Parameters which determine operation of the sampler, and in particular the information that is selected for transfer to the data collector, and/or the sampling rate are controlled by the controller 119. Parameters of the sampler that may be used to control selection of information from the traffic flow to the data collector may include traffic filters and/or aggregation schemes, or any other suitable parameters.

The controller may be adapted to control what information is stored in and what information is removed from the data collector. For example, the controller can remove information that is not relevant to a particular threat or attack that is being monitored, to create space for storing information that is relevant to the attack. In this way, the controller enables efficient use of embedded memory.

The controller may also control the compiler which compiles information from the data collector for export from the router. The controller may control what information is exported and/or the timing of the export. In this way, the controller can limit the exported data to that which is relevant to a particular monitoring task, such as monitoring a particular type of attack. The compiler may be controlled to generate a summary of information related only to a particular attack being monitored thereby potentially reducing the amount of exported data to reduce the burden on the network.

The controller may also control the threshold detector to vary threshold criteria in response to the state of the network, as described in more detail below.

Generally, the controller 119 is adapted to adjust the meter parameters based on the current "state" of the user traffic that it is monitoring.

In one embodiment, the controller has a plurality of different states each defining a particular monitoring criteria. The different states may include a "Normal" state which reflects a situation where no attack is suspected. In the normal state, the controller 119 directs the monitor (and in particular the sampler 109) to apply a low sampling rate to all user traffic. In this mode, the monitor is also directed by the controller to frequently compare the flow statistics which are generated to certain thresholds in order to assess whether an attack may be occurring. Thresholds may be defined so that a particular threshold is indicative of a particular type of attack and/or an attack on a particular portion of the network.

If the threshold detector 115 detects a condition where a particular threshold is exceeded (or reached), then this indicates that a certain type of attack is potentially underway. The controller 119 reacts to this condition by changing its state to reflect the particular attack that has been detected. For example, this might be the detection of a Denial of Service (DoS) attack directed at a certain subnet. The change of state of the controller causes the meter (or monitor) parameters to be altered in such a way as to help isolate the attack characteristics. This might include applying a finer flow granularity and/or higher sampling rate only for the portion of traffic containing the suspected attack. The number of potential states into which the controller can transition may be determined by the number of attacks that the system is capable of detecting.

In addition, different states may be grouped according to different levels. One level may contain one or more monitoring states where an attack is not suspected, a second level may contain one or more monitoring states where an attack is suspected, and a third level may contain one or more monitoring states where an attack is detected. The level where an attack is not suspected may include the normal state, as described above. States within the second level, where an initial threshold for a particular attack has been exceeded and an attack is suspected, may each include a different traffic filter, each of which enables monitoring of a particular portion of the communication network. Each state within the second level may include a particular sampling rate, and the sampling rate may be higher than (or the same as) that of the "normal" state. Each state of the second level may include an associated aggregation scheme which selects according to packet header (or body) information, which individual data flows are to be ignored, which conversely enables the sampler to better restrict its sampling to those data flows which are indicative of the suspected attack. Each state in the second level may have an associated threshold, which if exceeded is indicative of a situation in which an attack is actually occurring. The particular second level state of the monitor which is selected or adopted by the controller may depend on which threshold of the first level (or normal state) was exceeded. In this way, the exceeded threshold of the previous level controls the monitor to 'zoom in' on data in the traffic associated with an attack.

The third level, which indicates that an attack has been detected, may also include a number of different states into which the controller can transition from a state in the second level. The particular state in the third level assumed by the controller can be governed by the particular threshold of the second level that has been exceeded. Again, each state in the third level may include one or more traffic filter to allow monitoring only of the specific portion of the communication network in which the suspected attack was detected, a sampling rate, which may be higher than (or the same as) the sampling rate of an associated state in the second level, and an aggregation scheme which may further increase the number of different types of packet header (or body) fields which are to be ignored for the purposes of monitoring. This enables the monitor to concentrate its sampling on information from data packets whose packet header (or body) information is relevant to the detected attack, to allow more information about the actual attack to be collected for analysis, and without necessarily using more processing cycles or memory space. The third level may include any one or more of the states described above and/or any other state(s).

In the embodiment of FIG. 3, different threshold levels for use by the threshold detector 115 may be stored locally at the router. Different thresholds may be associated with different malicious threats and grouped according to the level in which the controller is operating, for example as described above in which level 1 is a low level or normal monitoring level, level 2 is a level where a malicious attack is suspected, and level 3 is an operating level where a malicious attack has been detected. The various thresholds may be stored in a threshold definition table, an example of which is shown in FIG. 4. Referring to FIG. 4, the far left-hand column indicates the type of threat (or attack) (threat 1, threat 2, threat 3, etc.). The second column contains threshold values for each different threat at level 1, i.e. when the monitor is in the lowest or normal monitoring state. The third column contains threshold values for each threat for level 2 states, i.e. where a particular threat is suspected as a result of a level 1 threshold being exceeded. Each level 2 threshold is set such that if it is exceeded, this indicates that the particular threat is occurring and has been detected. If a level 2 threshold is exceeded, the monitor transitions to a third level to more closely monitor traffic which is associated with or represents the particular threat or attack. The threshold definition table includes an optional third column of threshold values at level 3. Each of these thresholds is associated with a particular threat and may be used to determine the severity of an attack or any other parameter associated therewith which allows additional information about the attack to be resolved.

As mentioned above, each different threshold may be configured so that it represents a particular type of malicious attack or threat when exceeded. In response to a threshold being exceeded, the controller selects a new state for the monitor in which each state contains parameters which control how the monitor operates. Each state at each level represents monitoring criteria and the states may be stored locally at the router for use by the controller in reconfiguring the monitor when a threshold level is exceeded. An example of a monitoring criteria table which may be used by the controller is shown in FIG. 5. Referring to FIG. 5, the left-hand column contains level 1 threshold values for each type of threat or attack the monitor is configured to detect. Column 2 contains monitoring criteria (MC1T1, MC1T2, MC1T3, etc) corresponding to each threshold level and its associated threat (as indicated in column 1), where the monitoring criteria is used by the controller to configure the monitor if a respective level 1 threshold is exceeded. Thus, the monitoring criteria in column 2 are applied in level 2 monitoring, where a particular attack is suspected. Column 3 contains level 2 threshold values for each threat. Column 4 contains monitoring criteria (MC2T1, MC2T2, MC2T3, etc) corresponding to each level 2 threshold and associated threat, which defines the state for the monitor when a respective level 2 threshold is exceeded, and which is used by the controller to configure the monitor when a malicious attack has been detected. The monitoring criteria may include values for one or more meter parameters which may include any one or more of traffic filter(s), sampling rate and aggregation scheme and/or other parameter(s).

The monitor may be adapted to detect any number of different types of malicious threats or attacks which may include viruses, port scans and denial of service attacks as well as others. The presence of a virus may be indicated by a large increase in traffic directed at a small number of ports. A port scan may be indicated by a large number of destination ports per source address. A denial of service attack may be indicated by an unusual increase in distinct flows directed at a particular destination address or subnet.

Figure 6:
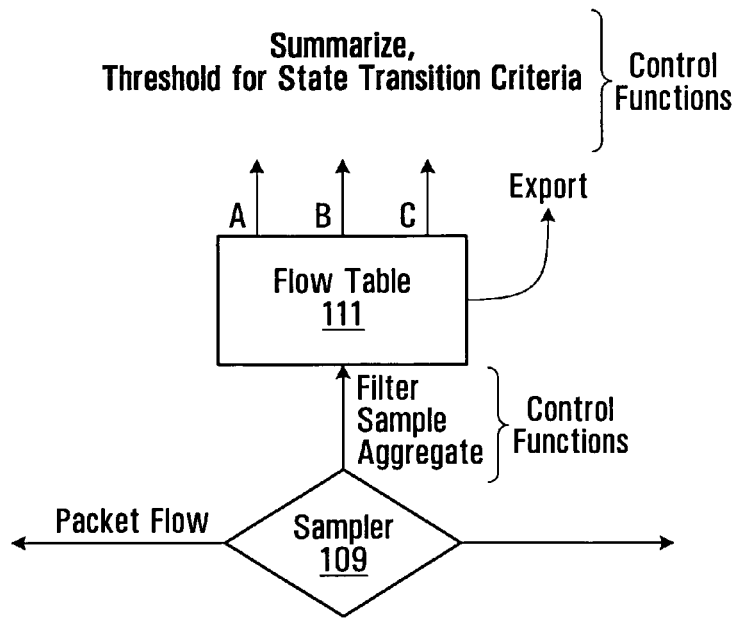
FIG. 6 shows a schematic diagram of a router according to another embodiment of the present invention.
Figure 7:
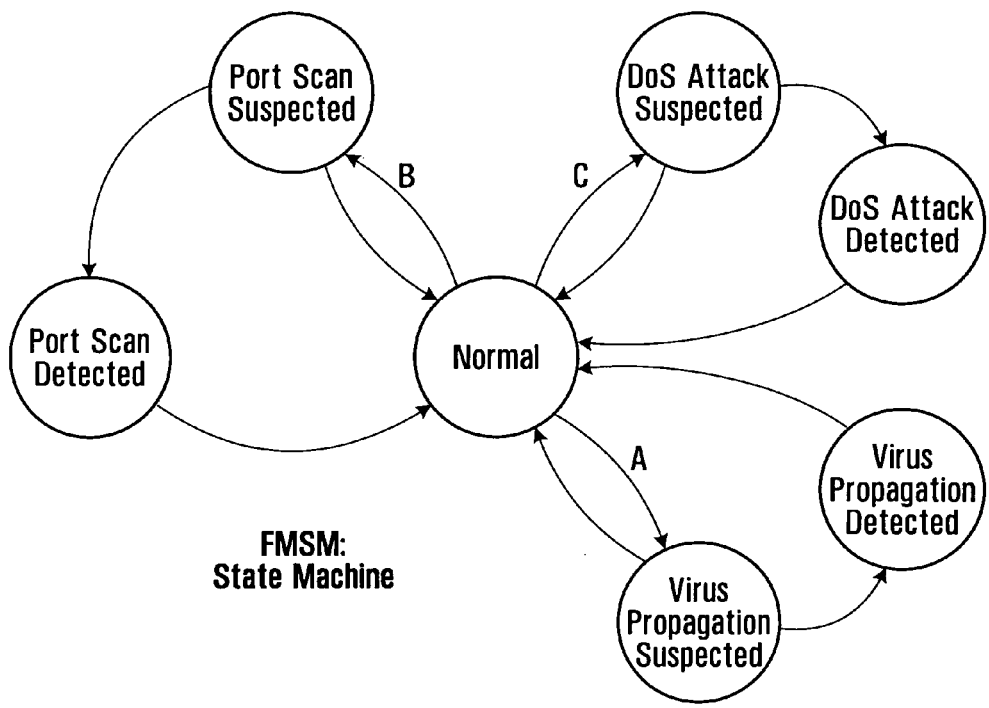
FIG. 7 shows an example of a state machine according to an embodiment of the present invention.

Examples of operations of the monitor in detecting various malicious threats and which are illustrative of the various states of the monitor and the individual transition criteria and associated set of actions associated with each state is described below with reference to FIGS. 6 and 7. FIG. 6 shows a schematic diagram of an embodiment of the monitoring system which is similar to that shown in FIG. 3, and like parts are designated by the same reference numerals. FIG. 6 also includes labels which correspond to labels in FIG. 7. FIG. 7 shows an example of a state machine for the monitor controller (or manager). The following example represents a sequence of transitions and actions for the programmable state machine in response to a DoS attack passing through the network.

(1) With the monitor controller in the normal state, no attacks are suspected, and all user traffic is monitored at a constant, low sampling rate.

(2) The flow data is tested against the threshold criteria for a "virus propagation suspected" state. This may be monitored by monitoring the total volume of traffic and number of distinct destination ports over the observation period as compared to the expected number of ports for that volume of traffic. A drastic increase in traffic directed at a small number of ports could indicate the propagation of a virus. Data used in making this determination is derived from the flow table (as indicated by arrow A) and compared against the threshold criteria. In this example, the test is not exceeded, and the monitor controller state stays at normal.

(3) The flow data is tested against the threshold criteria for a "port scan suspected" state. This may be monitored by monitoring the number of distinct destination ports per source address as compared to the expected number. A high number of destination ports could indicate a port scan is in progress. Data used in making this determination is derived from the flow table (as indicated by arrow B) and compared against the threshold criteria. In this example, the test is not exceeded, and the monitor controller state stays at normal.

(4) The flow data is tested against the threshold criteria for a "DoS attack suspected" state. This may be monitored for example by monitoring the number of distinct flows within a destination address subnet over the observation period, as compared to the number of expected flows. A drastic increase in distinct flows directed at a particular destination address or subnet could indicate a DoS attack is underway. Data used in making this determination is derived from the flow table (as indicated by arrow C) and compared against the threshold criteria. In this example, the threshold test is exceeded, and the monitor controller state transitions to the DoS attack suspected state.

(5) The monitor controller alters the monitor to increase its sampling rate, but using a filter that only samples packets from within the destination subnet that is potentially under attack. The flow granularity is also altered in order not to aggregate this flow data, so that the full characteristics of the attack can be determined.

(6) The new flow data observed under the altered meter parameters is tested against the threshold criteria for the DoS attack detected state, which is similar to the DoS attacked suspected test, but with the threshold scaled to reflect the new monitoring parameters. In this example, the threshold test is exceeded, and the monitor controller state transitions to "DoS attack detected".

(7) The monitor controller issues a notification to an application server that a DoS attack has been detected. The information used to make this determination is exported to the server, and may include flow data and/or monitoring parameters.

(8) The monitor controller alters the monitor to further isolate the attack, effectively "zooming in" on the malicious traffic in order to provide more information, and preferably as much information as possible, so that appropriate action may be taken to mitigate the attack.

Since monitor resource usage is only adjusted to isolate malicious traffic once a particular suspected attack has been identified, this system can easily scale to include a much greater number of states, and therefore a much greater number of attacks that can be detected than are shown in this example.

In some embodiments, control over the recursive steps to take in isolating the nature and source of an attack are included entirely in the router's control plane, and this may be the optimal configuration. In other embodiments, control over the recursive steps could at least partially or wholly be implemented in an external device, such as an external application server or other device. If this control is provided external to the router, substantial benefits are still realized over state of the art solutions. In some embodiments, the router exports flow data, without interpretation, to an external device. The exported data is interpreted by the external device, which then generates and transmits a control message to the router to change the monitoring parameters, as necessary. In other embodiments, the router is adapted to provide some or all interpretation of the collected flow data, and to export the results to an external device. In response, the external device may complete the analysis and transmit an appropriate control message to the router to update its monitoring parameters, as necessary. Dynamic updates to flow specifications used to monitor traffic, even if the control messages are generated by an external device, provide greatly reduced use of router and network resources for most situations, since, in contrast to the state of the art system, operators do not need to provision monitoring for the "worst case scenario", where the sampling rate is set to a constant maximum value to obtain as much information as possible.

Figure 8:
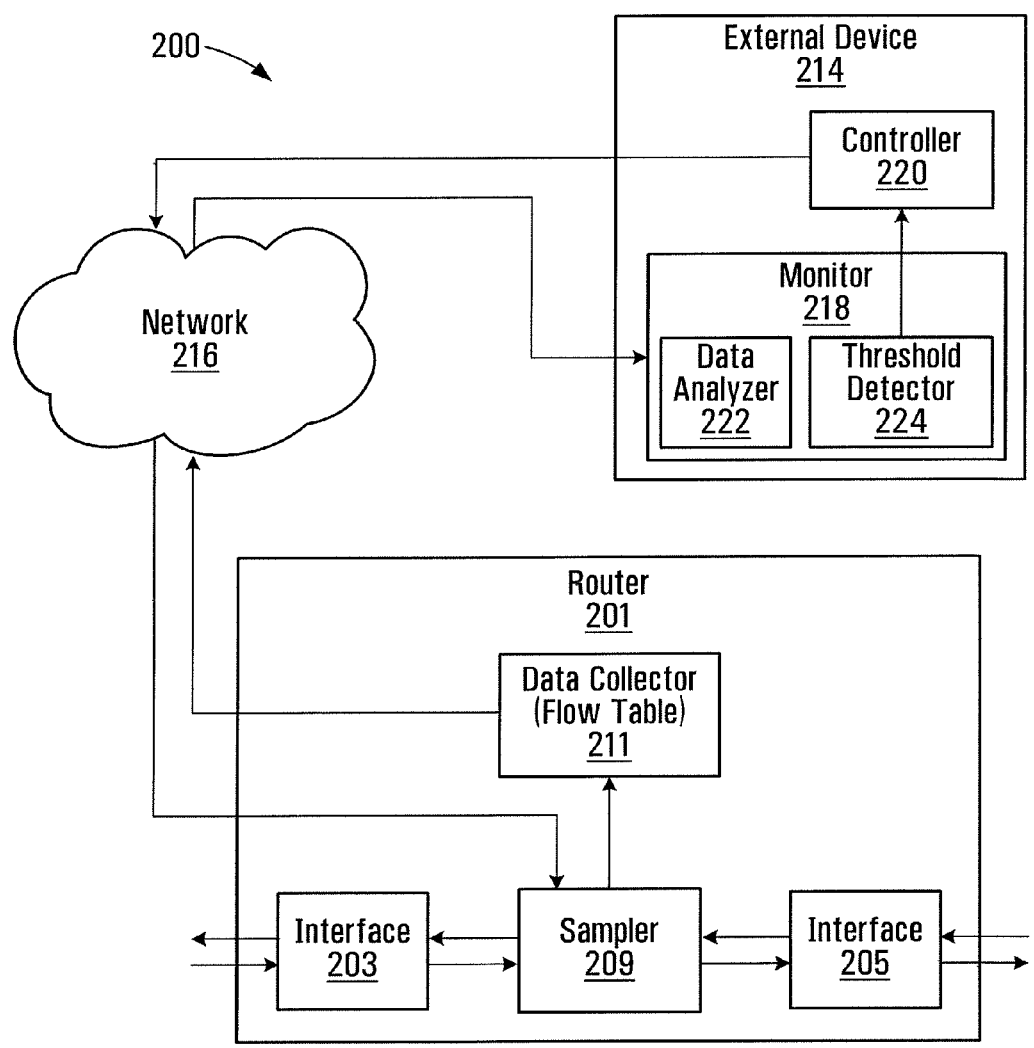
FIG. 8 shows a block diagram of a communication traffic monitoring system according to an embodiment of the present invention.
Figure 9:
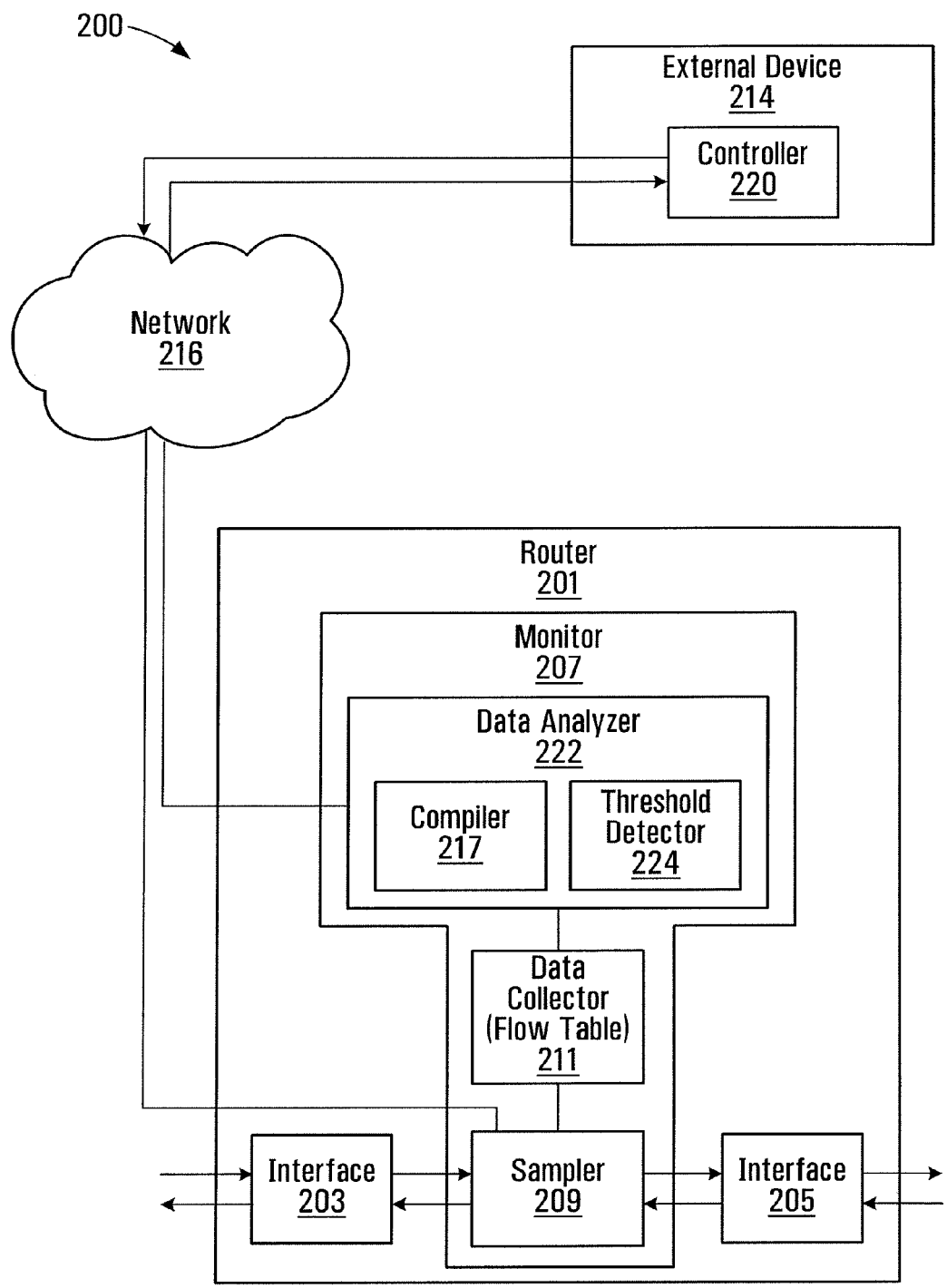
FIG. 9 shows a block diagram of a communication traffic monitoring system according to another embodiment of the present invention.

Examples of embodiments in which functions of the monitoring system are distributed between a router and an external device are shown in FIGS. 8 and 9. In the embodiment of FIG. 8, the router 201 comprises communication interfaces 203, 205 for connection to a communication network, a sampler 209 for sampling data from the network, and a data collector 211 for collecting and storing data transmitted by the sampler. The system 200 further includes an external device 214, which is connected to the router through a communication network 216, and includes a monitor 218 and a controller 220. The monitor includes a data analyzer 222 and a threshold detector 224. In this embodiment, the monitor and controller of the external device have the same or similar functions to the monitor and controller of the embodiment of FIG. 3. The router operates to transfer flow data collected for monitoring the presence of malicious attacks to the external device for analysis. If the threshold detector detects that a threshold has been exceeded, the controller 220 responds by transmitting an appropriate control message to the router to change the sampling parameters, as required. This may include changing any one or more of a traffic filter, sampling rate and aggregation scheme, or any other parameter(s) of the sampler that can be varied. The sampling state may be controlled by the external device 214 in proportion to the detected state of the network so that the sampler is controlled predominantly to sample relevant data, for example, that pertaining to a particular suspected or detected threat, thereby reducing the amount of data sampled and the amount of data transferred to the external device when the network is in the "normal", quiescent state.

FIG. 9 shows another embodiment of a monitoring system which is similar to that shown in FIG. 8, and like parts are designated by the same reference numerals. The main difference between the embodiments of FIGS. 8 and 9, is that in the embodiment of FIG. 9, the monitor 207 resides at the router 201, and the monitor controller 220 resides at the external device 214. In this embodiment, flow data derived from the sampler and collected in the data collector is monitored at the router. The monitor includes a threshold detector 224 for monitoring whether or not particular thresholds are exceeded, and if so, a message indicative of that fact is transmitted off-site to the external device 214. In response, the controller transmits a control message to the router 201 to enable the sampler 209 to adjust the sampling parameters, as required. Again, these may include any one or more of traffic filters, sampling rate and aggregation scheme. The control message (or another message from the controller) also contains information to configure the threshold detector to use different threshold criteria, as appropriate.

In this embodiment, the monitor also includes a compiler 217 for compiling information from the flow statistics for export from the router. The compiler may be adapted to select information for export that is only or predominantly relevant to a particular suspected or detected attack as determined by the monitor. In this way, the amount of information exported by the router can be significantly reduced in comparison to state of the art monitoring systems, thereby reducing the load on network resources.

Although the embodiment described with reference to FIGS. 6 and 7, for example, has three levels of states, namely 'normal', 'attack suspected', and 'attack detected', other embodiments may have fewer levels or more than three levels.

Other aspects and embodiments of the present invention comprise any one or more features disclosed herein in combination with any one or more other features disclosed herein, their equivalent or a variant that would be apparent to those skilled in the art.

Numerous modifications and changes to the embodiments described above will be apparent to those skilled in the art.

The invention claimed is:

1. A method of monitoring data traffic in a communication network, comprising:
   receiving the data traffic at a router connected to said communication network;
   monitoring, at said router, a flow of said received data traffic at a predetermined point on a flow path carrying said flow of the received data traffic, wherein said monitoring comprises a single stage monitoring process performed using exclusively one of a plurality of different monitoring criteria, including a first monitoring criteria and a second monitoring criteria, such that the data traffic that is subject to monitoring at said predetermined point is only monitored according to one of said monitoring criteria, and the second monitoring criteria isolates characteristics of a malicious threat;
   said monitoring further including monitoring said flow of the received data traffic at said predetermined point on said flow path according to said first monitoring criteria;
   based on information contained in the data traffic monitored according to the first monitoring criteria, determining whether data in the traffic is indicative of the malicious threat to one or more resources connected to said communication network, and only if said determining step determines that data in said traffic is indicative of the malicious threat, changing the monitoring criteria in said single stage monitoring process from the first monitoring criteria to the second monitoring criteria; and
   monitoring subsequently received data traffic at said predetermined point along said flow path according to said second monitoring criteria, instead of said first monitoring criteria.

2. The method as claimed in claim 1, wherein the step of determining comprises:
   comparing the information from the received data traffic with predetermined information indicative of a presence in the communication network of a malicious threat.

3. The method as claimed in claim 1, wherein said first monitoring criteria includes a first sampling rate at which received data traffic at said predetermined point is sampled to produce said information, and said second monitoring criteria includes a second sampling rate at which the received data traffic at said predetermined point is sampled, and said second sampling rate is higher than said first sampling rate.

4. The method as claimed in claim 1, further comprising:
   identifying a parameter associated with data in said traffic that is indicative of the malicious threat, and wherein said monitoring subsequently received data according to said second monitoring criteria comprises:
   controlling selectivity of data in said traffic for monitoring, based on said parameter.

5. The method as claimed in claim 4, wherein said controlling comprises:
   biasing the selectivity of data to be monitored towards data associated with said parameter.

6. The method as claimed in claim 1, further comprising:
   determining from information obtained from monitoring according to said second monitoring criteria, whether data in said received traffic is indicative of the malicious threat.

7. The method as claimed in claim 6, comprising only, if it is determined from information monitored according to said second monitoring criteria, that said data is indicative of the malicious threat, monitoring subsequently received data at said predetermined point according to a third monitoring criteria, different from said first and second monitoring criteria.

8. The method as claimed in claim 7, wherein said second and third monitoring criteria comprise second and third rates of sampling said received data, respectively, wherein said third sampling rate is higher than said second sampling rate.

9. The method as claimed in claim 7, wherein said second monitoring criteria includes collecting information indicative of one or more of a plurality of different threats, and said third monitoring criteria comprises collecting more information relating to said one or more different threats than is collected using said second monitoring criteria.

10. The method as claimed in claim 1, further comprising:
    transmitting from said router information collected by said monitoring according to one of or both said first and second monitoring criteria in response to determining that received data is indicative of the malicious threat.

11. The method as claimed in claim 1, further comprising:
    selecting information relating to data from which it is determined by said determining step is indicative of the malicious threat; and
    transmitting said data from said router.

12. The method as claimed in claim 1, wherein said first monitoring criteria includes collecting information that may be associated with a plurality of different malicious threats;
    said determining comprises determining if the collected information is indicative of a particular one or particular ones of said plurality of different malicious threats, and if it is determined that the collected information is indicative of the particular one or particular ones of said plurality of different malicious threats, said second monitoring criteria comprises restricting collection of said information to information associated with the particular one or particular ones of said plurality of different malicious threats.

13. The method as claimed in claim 12, wherein said first monitoring criteria includes a first sampling rate at which the received data traffic in said predetermined period is sampled, and said second monitoring criteria includes a second sampling rate at which the received data traffic at said predetermined period is sampled, and said second sampling rate is higher than said first sampling rate.

14. A network element for receiving and routing data traffic in a communication network, comprising:
    an interface configured to receive the data traffic from the communication network;
    a single stage monitor configured to monitor a flow of said received data traffic at a predetermined point on a flow path carrying said flow of the received data traffic, wherein said single stage monitor is configured only to perform a single stage monitoring process using an exclusive one of a plurality of different monitoring criteria, including a first monitoring criteria and a second monitoring criteria, such that the data traffic that is subject to monitoring at said predetermined point is only monitored according to one of said plurality of different monitoring criteria, and the second monitoring criteria isolates characteristics of a malicious threat; and
    a module configured to determine, based on information contained in the data traffic monitored by said single stage monitor according to said first monitoring criteria, whether the monitored data in the traffic is indicative of the malicious threat to one or more resources connected to said communication network, and only if said module determines that data in said traffic is indicative of the malicious threat, said module causing said monitoring criteria in said single stage monitor to change from said first monitoring criteria to said second monitoring criteria, said single stage monitor thereby being conditioned to monitor subsequently received data traffic at said predetermined point along said flow path according only to said second monitoring criteria instead of said first monitoring criteria.

15. The network element as claimed in claim 14, wherein said module includes a comparator configured to compare information based on the monitored information, with predetermined information indicative of a presence in said communication network of the malicious threat.

16. A network element for receiving and routing data traffic in a communication network, comprising:
    an interface configured to receive the data traffic from the communication network;
    a single stage monitor configured to monitor a flow of said received data traffic at a predetermined point on a flow path carrying said flow of the received data traffic, wherein said single stage monitor is configured only to perform a single stage monitoring process using an exclusive one of a plurality of different monitoring criteria, including a first monitoring criteria and a second monitoring criteria, such that the data traffic that is subject to monitoring at said predetermined point is only monitored according to one of said plurality of different monitoring criteria, and the second monitoring criteria isolates characteristics of a malicious threat; and
    wherein said single stage monitor is responsive to a detector only detecting that data in the traffic indicative of the malicious threat to one or more resources connected to said communication network to change said monitoring criteria from said first monitoring criteria to said second monitoring criteria, said single stage monitor thereby being conditioned to monitor subsequently received traffic at said predetermined point along said flow path according only to said second monitoring criteria instead of said first monitoring criteria.

17. The network element as claimed in claim 16, further comprising:
    said detector.

18. The network element as claimed in claim 16, further comprising:
    a module configured to determine a parameter indicative of said malicious threat, and wherein said second monitoring criteria biases said single stage monitor towards monitoring said data traffic associated with said parameter.

19. The network element as claimed in claim 18, wherein said module includes a comparator configured to compare information from the monitored data traffic with one or more threshold criteria, and is configured to determine said parameter based on a result of said comparison.

20. The network element as claimed in claim 16, wherein said single stage monitor includes a sampler configured to sample said data traffic at said predetermined point, said sampler being capable of sampling said data traffic at different sampling rates, and wherein said first monitoring criteria and said second monitoring criteria each include a sampling rate, wherein the sampling rate of the first monitoring criteria is different from that of the second monitoring criteria.

21. The network element as claimed in claim 16, wherein said single stage monitor comprises a sampler configured to sample said data traffic, and said sampler is capable of being configured to sample said data traffic according to a plurality of different sampling criteria.

22. The network element as claimed in claim 21, wherein each different sampling criteria defines a selection criteria for controlling the selection of information from the data traffic, wherein each selection criteria is different from another selection criteria.

* * * * *